Dec. 27, 1938.  F. CHEKIAN  2,141,204
FRUIT PITTING AND CUTTING MACHINE
Filed Dec. 18, 1936  4 Sheets-Sheet 1
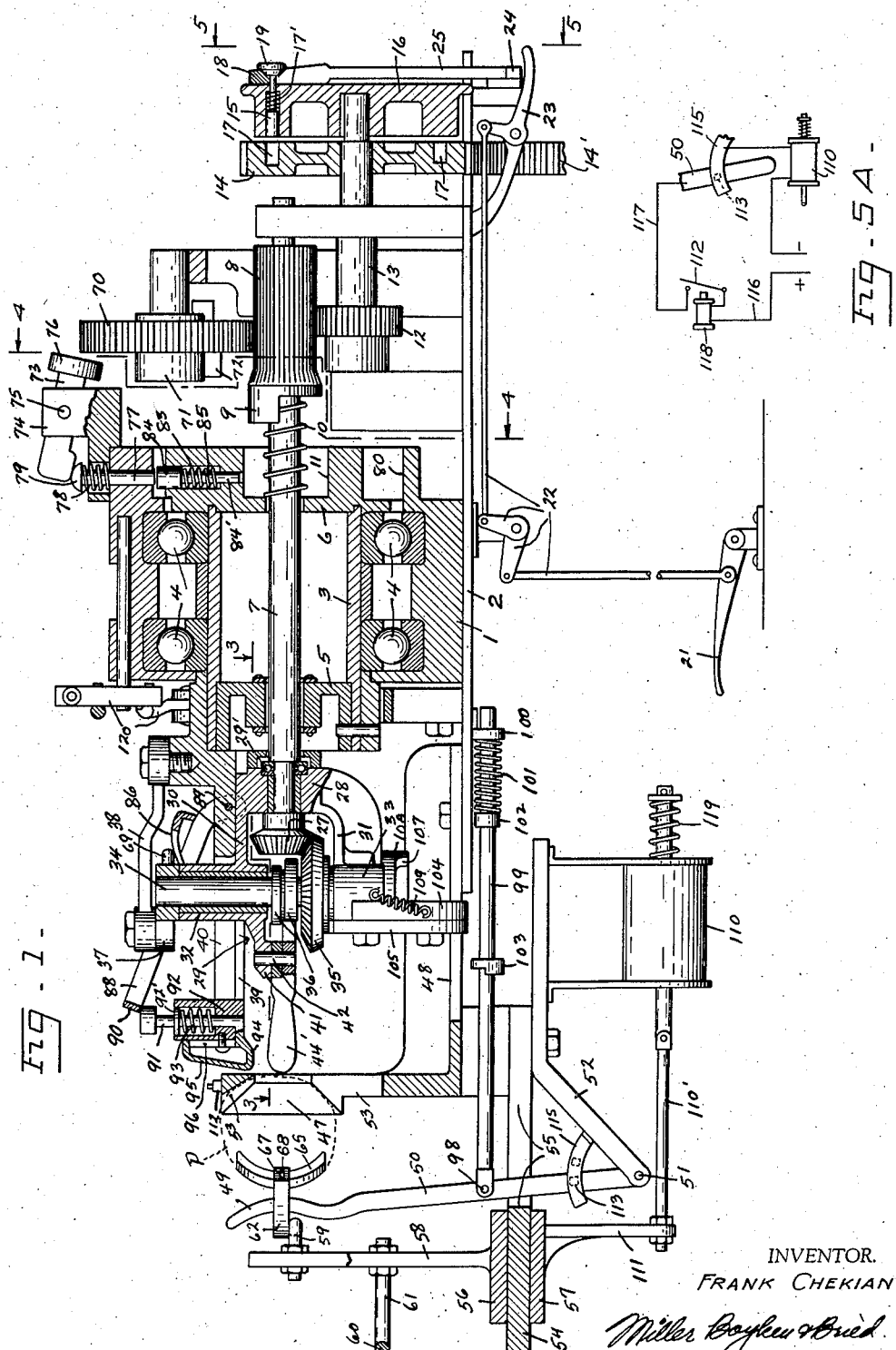
INVENTOR.
FRANK CHEKIAN
Miller Boyken & Bried
ATTORNEY.

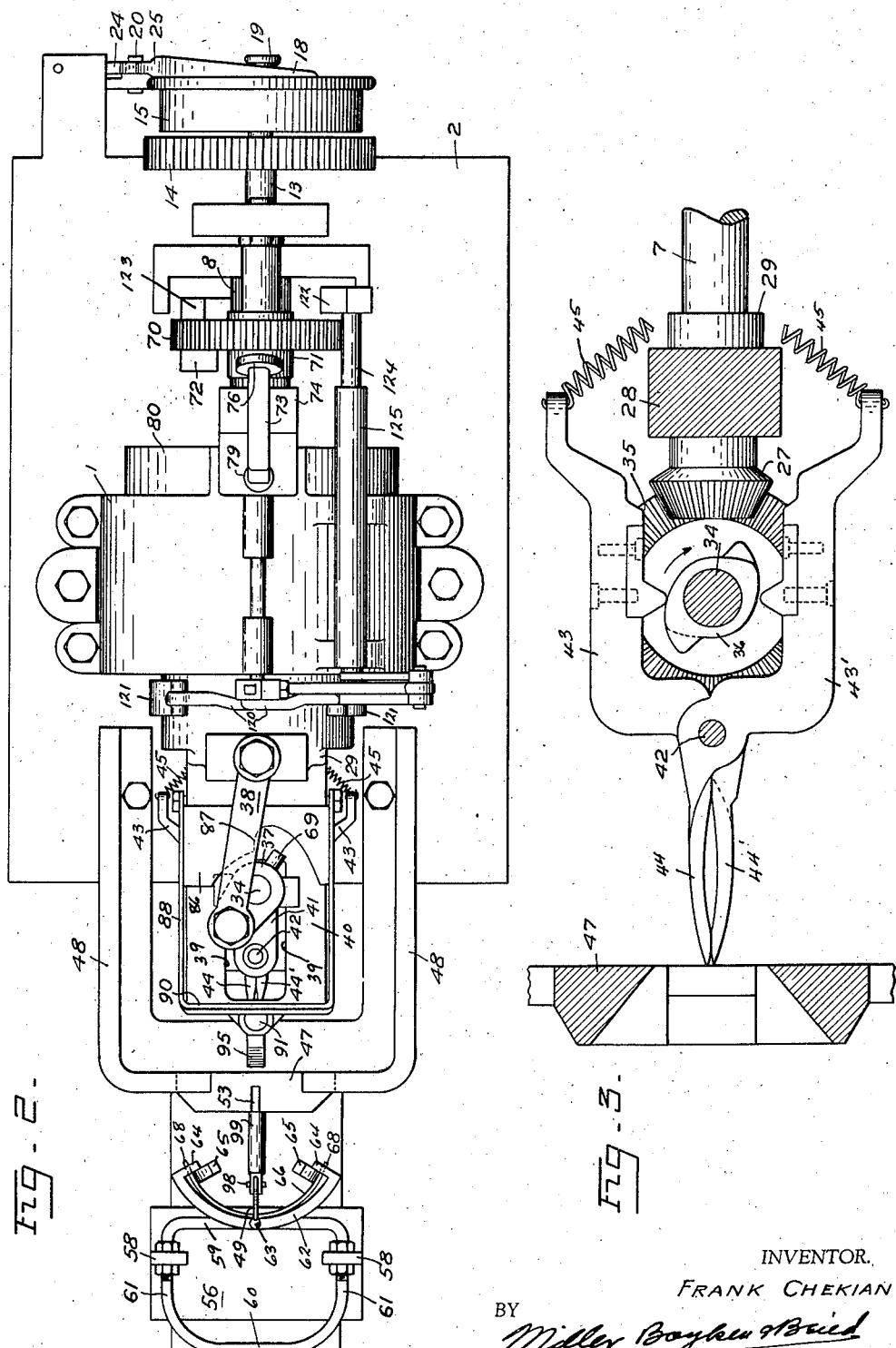

Dec. 27, 1938.         F. CHEKIAN         2,141,204
FRUIT PITTING AND CUTTING MACHINE
Filed Dec. 18, 1936         4 Sheets-Sheet 3

INVENTOR.
FRANK CHEKIAN
BY
Miller Boyken & Brick
ATTORNEY.

Dec. 27, 1938.    F. CHEKIAN    2,141,204
FRUIT PITTING AND CUTTING MACHINE
Filed Dec. 18, 1936    4 Sheets-Sheet 4

INVENTOR.
FRANK CHEKIAN
BY
Miller Boyken & Bried
ATTORNEY.

Patented Dec. 27, 1938

2,141,204

UNITED STATES PATENT OFFICE 2,141,204

FRUIT PITTING AND CUTTING MACHINE

Frank Chekian, Modesto, Calif.

Application December 18, 1936, Serial No. 116,526

11 Claims. (Cl. 146—28)

This invention relates to fruit-pitting machines and method for removing pits from drupes, such as peaches, and has for its object a machine adapted to remove the pits from whole fruit without the usual preliminary scoring or cutting of the fruit, and to halve the fruit after the pit is removed. Other objects are the provision of means for insuring positive clean removal of split pits from fruit as well as sound, whole pits, with practically no fruit adhering to the pits and an arrangement of elements in the machine whereby the fruit is quickly positioned for pitting and cutting and is automatically released upon completion of the pitting and cutting operation thereby enabling an operator to handle a large volume of fruit. Other objects and advantages will appear in the drawings and description annexed hereto.

In the drawings, Fig. 1 is a vertical cross-sectional view of my machine taken longitudinally through the machine with certain parts being shown in elevation, the elements being shown in starting position.

Fig. 2 is a plan view of my machine.

Fig. 3 is an enlarged fragmentary sectional view taken along the line 3—3 of Fig. 1 showing the pitting blades and their actuating cams and gears in elevation.

Fig. 5a is a diagrammatic view of the electrical circuit for actuating the mechanism for holding and releasing a drupe from pitting and cutting position.

Figure 4:
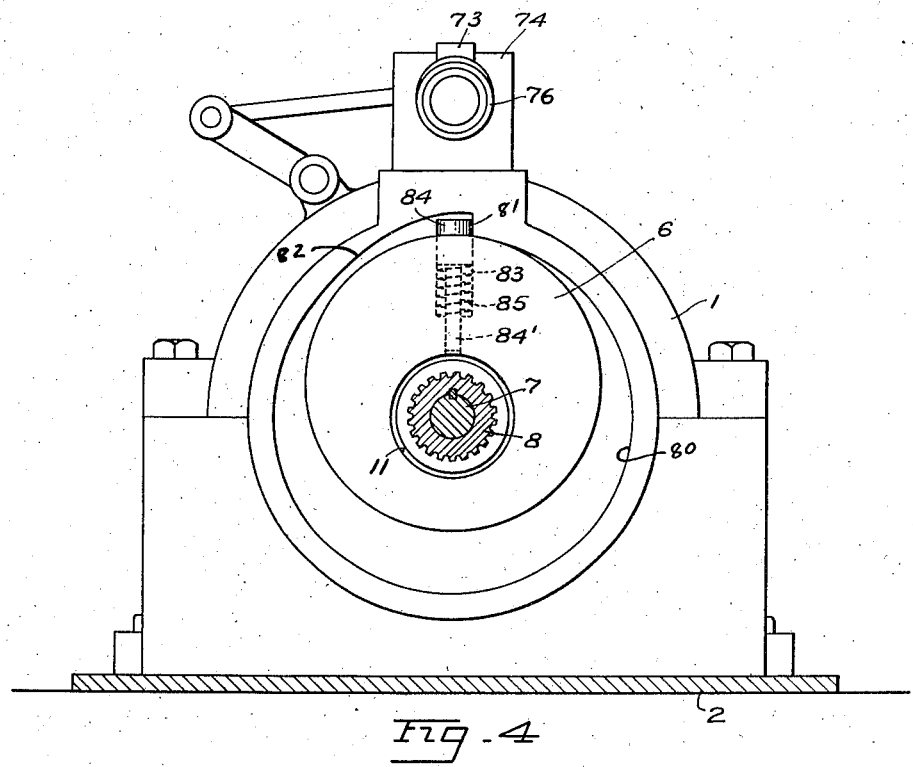
Fig. 4 is a sectional view taken along the line 4—4 of Fig. 1.
30

In detail, my machine, as illustrated, comprises a main central, horizontally disposed tubular body 1 secured to a base 2, which body mounts thereon a hollow cylinder 3 on ball-bearings 4 for revolving the cylinder within the body. In one end of cylinder 3 is fixedly secured a head 5, and a clutch member 6 is secured to the opposite end of the cylinder, but positioned outwardly thereof, both the head and clutch member being rotatable with the cylinder. The head and clutch member close opposite ends of the cylinder and are provided with central, horizontally aligned openings for freely passing a shaft 7 therethrough to project outwardly of the head and clutch member at opposite ends of the shaft. On the outwardly projecting portion of the shaft 7 adjacent the clutch member 6 is secured an elongated spur gear 8, the end of the gear adjacent clutch member 6 being formed on its axially facing end with an axially outwardly projecting clutch dog 9, and a coil spring 10 on shaft 7 reacts between the gear and clutch member 6 to normally force the gear and shaft 7 in a direction axially outwardly relative to said member, the member 6 being recessed at 11 around the shaft on the side facing the gear for receiving the clutch dog 9 therein upon movement of the gear toward the clutch member.

A spur gear 12 secured on a countershaft 13 meshes with gear 8, the countershaft in turn being driven through a drive gear 14 connected by gear 14' through any suitable reduction gearing to a motor (not shown).

Figure 5:
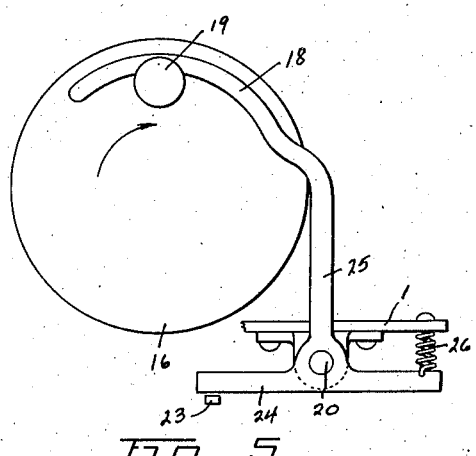
Fig. 5 is a fragmentary end view of the machine as seen from line 5—5 of Fig. 1.

The gear 14 is normally freely rotatable on the countershaft 13, but is clutched to the countershaft by a pin 15 carried on a disk 16 fixed to the countershaft, which pin is slidably carried at the outer margin of the disk 16 for movement axially of the countershaft to move into any one of a row of holes 17 formed in the side of the gear 14 facing the disk, upon movement of the pin toward the gear. The pin is normally urged to within one of the holes 17 by a spring 17' and is retracted by an arm 18 which arm is wedge-shaped longitudinally thereof on axially facing sides relative to the axis of the disk and extends generally concentrically relative to the axis of the disk and outwardly of the pin between a head 19 on the pin and the axially facing side of the disk adjacent the head. The arm 18 is pivotally mounted at 20 for movement of the arm to and out of a position between the head 19 and disk 16 (Fig. 5) through means of a foot lever 21 connected by linkage and bell crank connections 22 (Fig. 1) with a pivoted lever 23 that engages one end of a cross arm 24 secured to an extension 25 of arm, so that upon depressing foot lever the lever 23 engages one end of the cross arm 24 and throws the arm 18 out of position between the head 19 of pin 15 allowing the pin to move into one of the holes 17 for connecting the countershaft 13 and drive gear 14 to drive the gear 8 for rotating shaft 7 and revolving the cylinder 3 in the body 1. A spring 26 connects between the opposite end of cross arm 24 (Fig. 5) and the base 1 for normally urging the arm 18 to a position in which the arm will be between head 19 and disk 16.

The outer end of arm 18 is the narrowest point of the wedge form of the arm, thus, after the foot lever 21 is pressed, the disk and gear 14 will rotate together in the direction of the arrow (Fig. 5), the pin engaging in one of the holes 17 in the disk, and with the head 19 and pin 15 free of influence of the arm 18. When the pressure on the foot lever is released the arm moves into position to engage between the head 19 and disk 16 at the outer thin end of arm 18, and the wedge shape of the arm then will react between the head 19 and disk as the disk rotates one revolution to release the pin from engagement with gear 14, whereupon the gear 14 freely continues to rotate on shaft 13 until the pin is again released by foot lever 21 being depressed to make the connection between the disk and gear.

On the end of shaft 7 projecting outwardly of head 5 is secured a bevel gear 27, which gear is positioned outwardly, relative to head 5, of a portion 28 of a carriage generally designated 29, the shaft 7 rotatably extending through said portion 28 which portion is secured between a thrust bearing 29' at one side thereof and the gear 27 on the opposite side thereof to prevent axial movement of the shaft relative to said portion.

The carriage forming part of the portion 28 comprises an upper arm 30 and a lower arm 31 projecting axially of shaft 7 across the upper and lower sides of gear 27 and beyond said gear. Arms 30, 31, respectively, are formed with vertically aligned bearings 32, 33, respectively rotatably mounting opposite ends of a shaft 34. Between bearings 32, 33, a bevel gear 35 is secured to the shaft, which gear meshes with bevel gear 27, and adjacent the gear 35 the shaft 34 carries a cam 36, which will be later described.

The shaft 34 projects upwardly from upper bearing 32 at its upper end and a crank arm 37 is secured thereto at one of the ends of the crank arm while the opposite end is pivotally connected to the main body 1 by arm 38.

The carriage 29 is slidable horizontally on guides 39 upon axial movement of shaft 7, which guides are formed on a horizontal plate 40 that is secured to cylinder 3 for revolving with the cylinder during rotation of the latter. Said carriage also is formed with projection 41 projecting forwardly of bearing 32, to which projection is vertically pivoted at 42 a pair of horizontally spaced superposed arms 43, 43' (Fig. 3). These arms project horizontally from one side of the pivot 42 to lie on opposed sides of cam 36 and on the opposite side of the pivot 42 the arms are extended to form a pair of generally flattened, horizontally extending blades 44, 44' disposed with their flattened sides vertical and each blade being curved longitudinally with its outer free edge curved, the curved outer edges being normally spaced apart slightly for a purpose to be described later, but the blades engaging each other adjacent their outer edges.

The arms and blades, as above described, generally form a scissors-like arrangement with the blades engaging each other adjacent their outer ends and the arms carrying the blades being spaced apart.

The free ends of the arms are each connected with the carriage by a tension coil spring 45 arranged to tend to draw the blades together at all times, but which allows the blades to move apart against the tension of the springs 45.

Each of the blades 44, 44' has one of its oppositely vertically facing horizontally extending edges sharpened so that upon rotating or revolving the blades with the carriage, in the direction of the cutting edges, the blades will simultaneously cut in arcuate paths around the axis of rotation of the carriage, since the blades are disposed centrally on opposite sides of the axis of shaft 7, which is the axis of rotation of said carriage.

Adjacent the outer curved edges of the blades is a vertically disposed substantially annular fruit supporting and positioning device 47 formed with its central annular opening in co-axial alignment with the axis of rotation of the carriage, which device is provided with a horizontally extending pair of spaced arms 48 extending below the carriage to the base 2 where the arms are secured to the base. The axially facing side of said positioning device is beveled on the side outwardly of the blades for aligning a drupe, such as a peach, with the pit of the peach on the axis of rotation of the carriage.

Still further outwardly of the carriage and outwardly of the device 47 is a vertically extending cutting knife 49 formed with a convexly extending vertical cutting edge adjacent the device. An arm 50 is formed integrally with the knife in downward extension thereof, which arm is pivotally supported at its lower end at 51 to a bracket 52 that is secured to the arms 48 that carry the device 47, although it is obvious that the bracket may be secured in any desirable means directly to the base.

By reason of the above construction the knife may be swung on pivot 51 to bisect a drupe positioned by the positioning device 47, the annular positioning device being centrally vertically slotted at 53 for receiving the knife when the knife is moved forwardly.

Extending from below the arms 48, and secured thereto, is a horizontally disposed plate 54 that is formed with an elongated opening 55 for passing the arm 50 of the knife therethrough. Slidably mounted on said plate for oscillatory sliding movement back and forth toward the carriage is an upper, 56, and a lower, 57, plate which upper and lower plates are connected at opposite edges for sliding together, with the plate 54 therebetween. A pair of posts 58 extend upwardly from the upper plate 56, said posts being disposed on opposite sides of the axis of revolution of the carriage and being connected by a cross bar 59 extending between their upper ends. A second U-shaped cross bar 60 is secured at its free ends to the posts, which bar 60 with its legs 61 is disposed in a horizontal plane on the side of the posts in a direction outwardly of the side thereof adjacent the carriage, so that an operator standing at the end of the machine can readily press against the cross bar in the direction of the carriage for sliding the plates 57, 56 and the posts, together with cross bar 59, toward the carriage. The cross bar 59 carries a generally U-shaped member 62 centrally thereof, said member 62 being disposed with its concave side facing the carriage, and the connection between the member 62 and cross bar comprising a vertical pivot 63 centrally positioned between the ends of the member 62. The ends of the member 62 are formed with inwardly projecting ends 64, and positioned within the projecting ends 64 are a pair of vertically extending elongated longitudinally curved elements 65 disposed with their concave surfaces generally facing toward each other, which elements are secured to the outer ends of a flat curved spring 66, with its convexly curved side adjacent the concave surface of the member 62 and the curvature of the spring being generally that of the member 62, but slightly more pronounced so that the ends of the spring are spaced from the ends of the member 62, the spring being centrally secured to the center of the member 62. The inwardly projecting ends 64 are horizontally slotted at 67 and a projection 68 at each end of the spring 66 extends through the slot for sliding thereon when pressure is applied to the elements 65 such as occurs when a peach is placed against the positioning device 47 and the operator moves the mounting 56, 58, 59, forwardly until the elements 65 engage the peach, said elements 65 being curved and positioned to fit against the opposite sides of a peach at the end opposite that engaging the device 47.

Referring again to the end of the machine opposite the carriage, a spur gear 70 is mounted on the base 2 over the gear 8 and in mesh therewith. At the side of the gear 70 adjacent the machine, is a hub 71 secured to the gear, which gear is provided with a radially extending projection 72, which projection in starting position is shown in Figs. 1 and 2. The body 1, at the end adjacent gear 70, carries a rocker arm 73 centrally pivoted to an extension 74 of the body on a horizontal pivot 75, one end of the arm overhangs the hub, which end mounts a roller 76 that is adapted to be engaged by the projection 72 for rocking the arm upwardly as the gear 70 is revolved. The other end of the arm 73 overhangs the portion of the body 1 that is directly over the clutch member 6. A vertical pin 77 slidably extends through the body 1 directly below said other, or inner, end of arm 73 and is held elevated at its upper end above the body, by a coil spring 78 reacting between the head 79 of the pin and the body.

The clutch member 6 is disposed within the end of the body 1, the inner wall 80 of said end of the body (Fig. 4) being generally cylindrical, and the circular clutch member 6 being eccentrically mounted on the shaft 7, which shaft is concentrically disposed relative to the inside wall of the body. This wall 80 is notched out at its upper side to form a square shoulder 81 facing oppositely to the direction of rotation of shaft 7 and clutch member 6, and the wall of the body from the radially outer extremity of the shoulder joins with the true cylindrical wall 80 by a gentle curve as at 82.

Slidably mounted within an opening 83 extending radially outwardly of the clutch member through the widest portion thereof is a pin 84 normally urged outwardly of the peripheral side of the clutch member by a coil spring 85. The peripheral side of the clutch member through which the spring tends to urge the pin is in slidable engagement with the cylindrical portion of wall 80, hence when the pin is rotated to the shoulder 81, the pin engages said shoulder and the clutch member cannot rotate further until the pin is urged radially inwardly to clear the shoulder. When pin 84 is in engagement with the shoulder, it lies directly below the pin 77, hence upon rocking arm 73 by means of the projection 72 on hub 71, the pin 84 is forced out of engagement with the shoulder and the clutch member is free to revolve.

The revolving of the clutch member 6 is accomplished by engagement of the inner end 84' of the pin 84 with the dog 9 of gear 8 since revolution of shaft 7 actuates the levers 37, 38, to draw the shaft 7 axially in the direction to carry the dog 9 into the recess 11 for enagement of the dog with the inner end 84' of the pin 84.

The end of arm 37 that engages the vertical shaft 34 is provided with an outwardly projecting pin 69 that is positioned over a cam-like plate 86 which plate is notched at 87 to permit the projecting pin 69 to clear the plate 86 upon revolution of said pin in the direction of the arrow (Fig. 2). Cam plate 86 is secured between a pair of arms 88 extending outwardly from the end of the body adjacent shaft 34 on opposite sides of the shaft 34, the arms being pivotally connected at 89 at their inner ends to the body 1. The outer ends of the arms 88 are connected by a cross bar 90 which normally rests on the upper end of a vertical pin 91 which pin is vertically slidable in a bearing 92 carried on a projection of guides 39 and over the opening formed between blades 44 by reason of their concave adjacent sides. The pin 91 is held in elevated position by a coil spring 93 reacting between the bearing 92 and a collar 92' secured to the pin.

At its lower end, below bearing 92, the pin 91 is formed with a downwardly inclined projection 94, which projection 94 has an upward extension 95 at its outer lower end formed to vertically slide in guides 96 on the outer end of the bearing.

The cam surface of cam plate 86 is upwardly inclined from the point where the projection 69 first engages the same during revolution of the projection, hence as the projection rides over the cam plate the member 94 is urged downwardly to between the blades 44, 44', the blades being opened at this point of movement, as will later be described, thereby ejecting the fruit pit that is engaged between the blades at that time.

The means for actuating the cutting knife 49 comprises a rod 99 pivotally connecting at one end at 98 to the downward extension 50 of the knife above the pivot 51, and slidable at its opposite end in a bearing 100 carried by base 2, which rod yieldably urges the knife outwardly of the drupe positioning device 47 by a spring 101 reacting between the bearing and a collar 102 secured to the rod.

Figure 6:
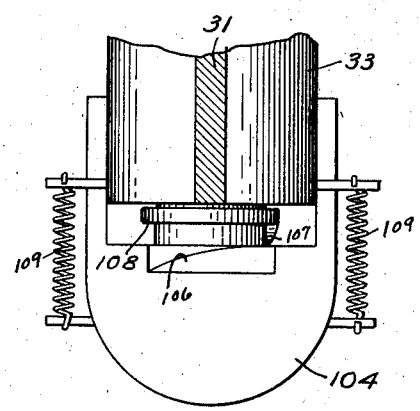
Fig. 6 is a fragmentary sectional view of a portion of my device for actuating the peach bisecting knife.

Spaced along rod 99 is a second collar 103. The collar 103 is adapted to be engaged by a block 104 which is vertically slidable on a plate 105 that is secured to the arm 31 of the carriage. The block is normally held in a position to clear the collar 103 until it is actuated by engaging cam surfaces 106, 107 respectively formed on the block 104 and collar 108 secured to the lower end of shaft 34 (Fig. 6). Springs 109 at opposite sides of the block normally yieldably support the block 104 clear of the collar 103.

The plates 56, 57 which mount the drupe engaging member 62 for movement to hold a drupe against device 47 is provided with a releasable means for holding the member 62 in engagement with the drupe, designated P in Fig. 1, which means comprises a solenoid 110 rigidly secured to the bracket 52 that mounts the knife arm 50, which solenoid includes a sliding core (not shown) connected by a rod 110' to a bracket 111 depending from plate 54. The coil of the solenoid is energized through actuation of a switch 112 mounted on device 47 where it is accessible to the hand of the operator upon positioning a drupe against the positioning device, and through brush connection 113, mounted on a segment 115 that is secured to bracket 52. The connection makes a circuit through lines 116, 117, including the knife arm, and when the knife is pulled forwardly through the drupe the connection between the arm and brush on the segment is broken, thereby breaking the hold-down relay 118 incorporated in the circuit, which relay acts to automatically hold the switch 112 down in closed position, after the operator has pushed the same to closed position, whereby the rod 110' and plate 54 are moved to carry the elements 65 away from the bisected drupe under influence of a coil spring 119, which spring tends to urge the solenoid core out of its position in the center of the solenoid coil.

Figure 7:
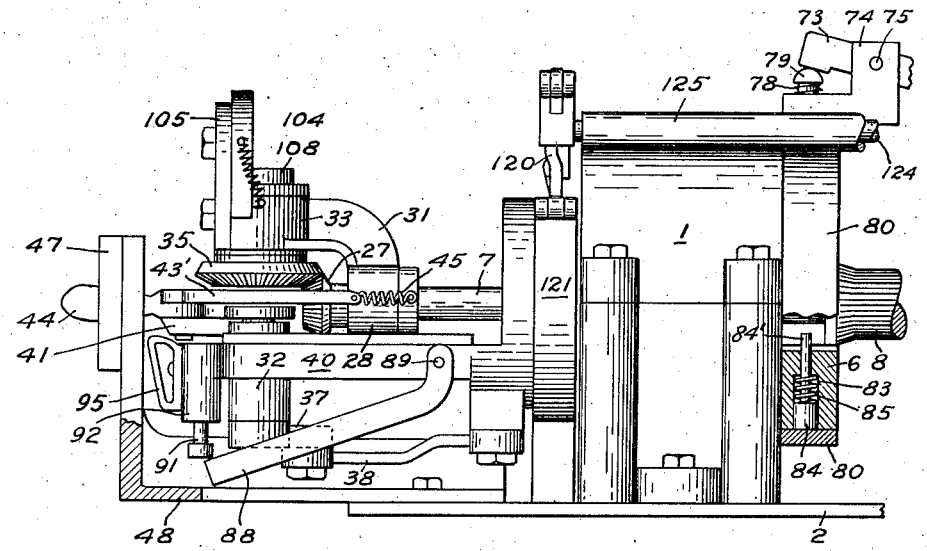
Fig. 7 is a fragmentary elevational view of the machine showing the pitting blades moved forward and the carriage mounting the blades being revolved to inverted position relative to the position shown in Fig. 1.
Figure 8:
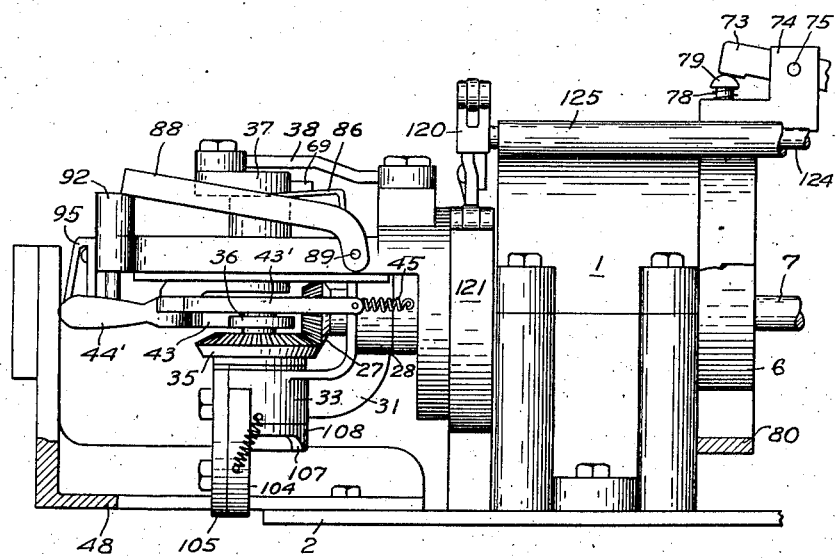
Fig. 8 is a fragmentary elevational view of the machine showing the pitting blades in retracted position and the carriage mounting the blades back in starting position and with the pit ejecting means operating to eject the pit from the blades.

The operation of the machine is briefly as follows, all of the figures except Figs. 7 and 8 showing the machine in starting position with a drupe, such as peach P firmly engaged between the elements 65 on member 62 and the positioning device 47 with the stem-end of the peach and pit in alignment with the blades 44, 44'.

The operator presses foot lever 21 thereby engaging disk 14 and clutch member 16 for rotation together whereupon the gear 8 is rotated and blades 44 on carriage 29 are urged into the peach, the spaced ends of the blades passing to opposite sides of the pit in said peach. The cam 36 on shaft 34 rotates in the direction of the arrow (Fig. 3) and gradually separates the blades 44 while the blades are moved into the peach and the high points of the cam are passed at the maximum longitudinal movement of the blades, thus enabling the blades to firmly grip the pit under influence of springs 45.

As soon as the maximum longitudinal movement of the blades is reached the dog 9 on gear 8 is within recess 11 of clutch member 6 and in engagement with the inner end 84' of pin 85, the pin 85 having been moved downward by engagement between projection 72 and roller 76 so the pin 85 clears the shoulder 81. The cylinder 3 is now free to make a revolution, which also revolves the blades 44, 44' around the pit of the peach to the position shown in Fig. 7, the pit resisting the tendency to turn since it is held by the meat of the peach. Thus the pit is cut loose from the peach.

After the revolution is completed, the blades are withdrawn from the peach through the movement of the crank arm 37 and likewise the dog 9 moves out of engagement with pin 84'.

The revolution of the cylinder 3 and blades having been completed, pin 84 engages shoulder 81 and the cylinder is stopped, but as shaft 7 continues to revolve, and the plate 104, which has moved over the collar 103 during outward movement of the carriage, is now moved downwardly to engage the collar by reason of cam 107 and the knife 49 is drawn through the peach as the pit is withdrawn therefrom and the carriage moves toward the body. Thus the bisecting operation is practically simultaneous with withdrawal of the blades with the pit.

The cam 36 acts to spread the blades 44, 44' when the pit is out of the peach and at the same time the pin 85 on crank arm 37 engages cam plate 86 forcing the pin 91 downward through movement of cross arm 90 which is carried by the cam plate, the projection 94 on the pin knocking the pit from between the blades.

Immediately upon completion of the stroke of knife 49 for bisecting the peach, the circuit through the solenoid coil is broken, also the hold-down relay that holds switch 112 in closed position is de-energized, and the bisected peach is released, the members 65 moving away from the peach under influence of the spring 119. Also the rotation of cam 107 releases the block 104 whereupon the knife 49 moves back to starting position under influence of spring 111.

The drive connection between disks 14 and clutch member 6 is broken at the same time the knife 49 and members 62 are released thus rendering the machine inoperative until foot lever 21 is again depressed.

In order to insure against too abrupt stoppage of the cylinder 3 by engagement of pin 84 against shoulder 81, I provide a conventional brake mechanism 120 at the end of the body opposite the clutch member 6 that includes bands 121 actuated by engagement of a rocker arm 122 with a projection 123 on gear 70, which rocker arm connects with the brake mechanism through a shaft 124 rotatably extending the length of the body 1 through bearings 125.

The various gears of the device, as described, are proportioned to operate the elements in their sequence as above described.

In Fig. 7 the device is shown with the blades in position within a peach (not shown) and with the carriage having completed a half turn, while Fig. 8 shows the blades in spaced relation with the pit ejecting means operative to knock the pit from between the blades.

To commence a second pitting and cutting operation the operator places a peach against the peach positioning device, with the stem-end exposed through the opening in said device, and at the same time pushes forwardly on cross bar 60 to engage the fingers or elements 65 against the side of the peach opposite the stem end thereof. The operator then presses switch 112 energizing coil 110 and switch relay 118 which automatically operates to hold the peach in position. Foot pedal 21 is quickly depressed and then released and the various elements of the machine automatically operate, as described, to pit and cut the peach and to release the bisected peach.

Having thus described my invention, what I claim is:

1. The method of pitting and having peaches that comprises the steps of firmly supporting a whole peach in a fixed position with the stem-end thereof exposed, cutting the pit free from the meat of the peach through the stem-end thereof only, withdrawing the pit from the peach through the stem-end thereof and cutting the peach in half from the end opposite the stem-end toward the stem-end thereof while the pit is being withdrawn through the stem-end, releasing the peach from said fixed position after the peach is cut in half.

2. In a machine of the character described, drupe positioning means arranged and adapted to support a whole drupe in a position with the stem-end thereof exposed, a pair of elongated pit engaging members disposed side by side, means mounting said members for reciprocatory movement longitudinally thereof to within a drupe supported by said positioning means through the stem-end of such drupe with the members disposed along opposite sides of the pit of the drupe and then back to outside the drupe, means for reciprocating said members, means for causing said members to tightly grip the pit of the drupe after the members have moved to the position to within the drupe and during movement of the members outwardly of the drupe whereby the pit is withdrawn from within the drupe during such outward movement, and single cutting means operative during withdrawal of the members from the drupe for cutting the drupe in two.

3. In a construction as defined in claim 2, means for revolving said members relative to a drupe supported on the positioning means about the central axis of the supported drupe extending through the stem-end thereof when the members are in position within the drupe, on opposite sides of the pit thereof and before the members are caused to tightly grip the pit thereby freeing the pit from the meat of the drupe for facilitating withdrawal of the pit.

4. In a construction as defined in claim 2, the ends of the members adapted to initially enter a drupe supported and positioned by said positioning means being slightly spaced apart for receiving the stem-end of the pit of the supported drupe therebetween and for engaging opposite sides of the stem end of such pit when the members are moved to within the supported drupe and means yieldably urging said members to a position in which they are relatively close together while permitting the members to yieldably move apart under outwardly acting force between the members whereby the members are free to move apart under the influence of the pit of the supported drupe when moved into the drupe with the pit thereof between the members.

5. In a construction as defined in claim 2, the ends of the members adapted to initially enter a drupe supported and positioned by said positioning means being slightly spaced apart for receiving the stem-end of the pit of the supported drupe therebetween and for engaging opposite sides of the stem-end of such pit when the members are moved to within the supported drupe, said members being formed with opposed curved adjacent surfaces from a point adjacent said ends of the members toward the opposite ends thereof, the curve of said surfaces conforming generally to the contour of the opposite sides of the pit of the supported drupe whereby said surfaces will closely fit along the curved sides of the pit when the members are within the supported drupe.

6. In a machine of the character described, means for supporting a drupe with the pit therein, means arranged and adapted for cutting the pit free from the flesh of the supported drupe through the stem end only of said drupe without cutting or mutilating the skin at the lateral sides and opposite end of the drupe and for withdrawing the pit from within the drupe through the stem end thereof, single means arranged and adapted for completely bisecting the drupe substantially simultaneously with withdrawal of the pit therefrom.

7. In a machine of the character described, means for supporting a drupe with the pit therein, means arranged and adapted for cutting the pit free from the flesh of the supported drupe through the stem end only of said drupe without cutting or mutilating the skin at the lateral sides and opposite end of the drupe and for withdrawing the pit from within the drupe, a single cutting blade disposed adjacent said opposite end of the supported drupe, means for moving the blade completely through the drupe in a direction from said opposite end to the stem end thereof for bisecting the drupe, means connecting said blade with the means for cutting the pit free from the drupe arranged and adapted to actuate said blade for bisecting the front substantially simultaneously with withdrawal of the pit from the drupe.

8. In a construction as defined in claim 7, means for holding said drupe in firm engagement with the means for supporting the drupe against movement of the drupe laterally endwise during the operations of cutting the pit free from the drupe and bisecting the drupe by the cutting blade.

9. In a machine of the character described, a rigid, stationary generally cup-like peach positioning member, means for releasably holding a peach in position against said member, a knife for bisecting a peach positioned by said member, pitting means for removing the pit from a peach so positioned through one side of the peach, means automatically operative for actuating said knife to bisect a peach positioned in said member only after actuation of the means for removing the pit, and means for actuating the pitting means, said last mentioned means comprising a pair of elongated cutting blades arranged and adapted to move longitudinally into a positioned peach to opposite sides of the pit therein and to revolve around the pit for freeing the pit from the flesh of the peach, said positioning member being formed with an opening therein for passing said blades to the peach, and means automatically operative after bisecting the peach by said knife for actuating the means holding the peach against the positioning means for releasing the peach from said position.

10. In a fruit pitting machine, a stationary drupe supporting member providing a cup-like seat for the drupe with the axis of the seat generally horizontally disposed, means providing a complementary seat movable into juxtaposed position to hold the drupe against said first seat, means for securing said holding means in holding position, means for withdrawing a pit from the drupe, means operative in following relation with said withdrawing means for slicing the drupe, and means operative incident to the completion of the withdrawal and slicing operation for releasing said drupe holding means.

11. In a device as set forth in claim 10, and means operative on completion of the slicing operation for ejecting a pit from said withdrawing means.

FRANK CHEKIAN.